United States Patent [19]

Greiner et al.

[11] Patent Number: 5,728,183
[45] Date of Patent: Mar. 17, 1998

[54] SHIFT REACTOR FOR USE WITH AN UNDEROXIDIZED BURNER

[75] Inventors: Leonard Greiner; David M. Moard; Bharat Bhatt, all of Costa Mesa, Calif.

[73] Assignee: Hydrogen Burner Tech., Inc., Long Beach, Calif.

[21] Appl. No.: 471,404

[22] Filed: Jun. 6, 1995

[51] Int. Cl.[6] ........................................... B01J 7/00
[52] U.S. Cl. ............................ 48/61; 48/69; 48/107; 422/149; 422/193; 422/220; 423/655
[58] Field of Search .................... 48/61, 107, 127.9, 48/69; 422/149, 193, 195, 207, 220, 231; 423/655, 656; 429/19, 20

[56] References Cited

U.S. PATENT DOCUMENTS

| | | | |
|---|---|---|---|
| 2,356,628 | 8/1944 | Stalmann | 422/193 |
| 2,644,744 | 7/1953 | Hartwig et al. | 48/127.9 |
| 2,728,650 | 12/1955 | Glazier | 423/655 |
| 2,934,407 | 4/1960 | Simanek et al. | 423/655 |
| 3,190,730 | 6/1965 | Korwin | 422/193 |
| 3,262,758 | 7/1966 | James et al. | 422/193 |
| 3,271,110 | 9/1966 | Bratzler | 423/656 |
| 3,292,998 | 12/1966 | James | 423/655 |
| 3,353,922 | 11/1967 | Wunning | 422/193 |
| 3,499,797 | 3/1970 | Hooper | 423/656 |
| 3,516,807 | 6/1970 | West et al. | 48/107 |
| 3,655,448 | 4/1972 | Setzer | 429/20 |
| 4,218,423 | 8/1980 | Robin et al. | 48/69 |
| 4,367,076 | 1/1983 | Peise | 48/69 |
| 4,522,894 | 6/1985 | Hwang et al. | 429/19 |
| 4,539,267 | 9/1985 | Sederquist | 429/19 |
| 4,716,023 | 12/1987 | Christner et al. | 429/19 |
| 4,808,197 | 2/1989 | Ayers | 48/69 |
| 4,950,309 | 8/1990 | Schulz | 423/655 |
| 4,980,145 | 12/1990 | Hsiung et al. | 423/655 |
| 5,437,123 | 8/1995 | Greiner et al. | 48/107 |
| 5,441,546 | 8/1995 | Moard et al. | 48/107 |

FOREIGN PATENT DOCUMENTS

| | | | |
|---|---|---|---|
| 0321739 | 6/1989 | European Pat. Off. | 423/656 |
| 2250036 | 4/1973 | Germany | 423/655 |
| 0188405 | 1/1990 | Japan | 423/656 |
| 0188406 | 7/1990 | Japan | 423/656 |

Primary Examiner—Timothy McMahon
Attorney, Agent, or Firm—Roger A. Marrs

[57] ABSTRACT

A shift reactor is disclosed that is mounted on the exhaust end of an underoxidized burner so that the exhaust product is introduced to a cooler water bath in a compartment of the reactor. The exhaust product is passed through the water bath via submerged gas diffusers. The reactor compartment includes a collection chamber for receiving the bathed exhaust product containing hydrogen gas which is then exited to a shift catalyst chamber. The latter includes eductor for recirculation. A conduit may be coupled to the water bath for distributing heated water from the bath for exterior heating purposes or for purification means. A drain is operably connected to the conduit for permitting removal of excess water and a fill inlet is provided for adding water.

13 Claims, 1 Drawing Sheet

SHIFT REACTOR FOR USE WITH AN UNDEROXIDIZED BURNER

BACKGROUND OF THE INVENTION

1. Field of the Invention

This invention relates to the field of apparatus for hydrogen generation, more particularly to a novel simplified shift reactor for use with an underoxidized burner which substantially increases the concentration of hydrogen by reacting carbon monoxide and water to form hydrogen. The apparatus has widely diversified uses in providing hydrogen generation, in general, including fuel for fuel cells and on-site hydrogen production, and for injection into combustors of internal combustion and turbine engines to reduce nitrogen oxide emissions.

2. Brief Description of the Prior Art

Underoxidized burners having a single or double stage internal combustion chamber for receiving gaseous or liquid fuel for combining with air or oxygen and subsequent ignition by a spark plug are disclosed in prior U.S. Pat. Nos. 5,207,185 and 5,299,536 as well as in co-pending U.S. application Ser. No. 08/148,472. Additionally, U.S. application Ser. No. 08/309,041 discloses improvements in injectors for such burners. These devices have been successful in producing hydrogen from fuels. However, they also produce carbon monoxide, CO, which can be minimized and the concentration of hydrogen increased by the shift reaction between CO and water, as $CO+H_2O=CO_2=H_2$. Conventionally, this reaction involves passage of gaseous water (steam) and CO through a catalyst bed.

Calculations and tests have shown various advantages can accrue to the shift reaction and the overall system by including a liquid water bath before the catalyst chamber wherein the products of the underoxidized burner are passed.

Therefore, a long-standing need has existed to provide a simple shift reactor for use with an underoxidized burner which will readily increase the concentration of hydrogen, and with other advantages as heated water for various heating purposes, simplified means to add water vapor without likelihood of detrimental water condensation in the shift catalyst, means to increase the extent of the shift reaction, means to eliminate certain undesirable side reaction products of the burner, and the like.

SUMMARY OF THE INVENTION

Accordingly, the present invention involves improvements derived from a novel shift reactor coupled with an underoxidized burner so that its exhaust products are introduced into a compartment partially occupied by liquid water, which is of a cooler temperature than the exhaust products.

The compartment includes gas diffuser(s) for distributing the exhaust gases into the surrounding water bath whereby the product is cleansed and filtered into a more purified state, and the product gases are saturated with water. Additional conduit means communicates with the water bath so that heated liquid water from the process may be conducted from the compartment for other heating purposes. An excess drain may be connected to the conduit for draining off a quantity of liquid water from the bath and regulating the water temperature, when desired, and/or for removing water soluble and/or water dispersible impurities.

The hydrogen-containing gas product from the water containing compartment is passed into a catalytic reactor section. The latter includes an internal eductor that automatically educts a portion of the gases that have passed through the catalyst and cause it to pass back through the catalyst to effect a degree of recirculation. Subsequently, the purified product with increased hydrogen concentration is passed to a use function.

Therefore, it is among the primary objects of the present invention to provide a novel shift for use with an underoxidized burner which accepts the exhaust mixture of hydrogen and carbon monoxide for filtering, cleansing and hydrating in a bath of a temperature lower than the temperature of the mixture and also includes a shift reactor with a degree of recirculation so that the concentration of hydrogen is increased.

Another object of the present invention is to provide a novel shift reactor which provides a low cost and practical method and apparatus for collecting useful thermal energy normally provided by an underoxidized burner by circulating heated water through a downstream system.

Yet another object of the present invention is to provide a novel shift reactor for use with an underoxidized burner which produces soot whereby the soot spontaneously forms a dispersion in the water from which it can be readily filtered.

Yet another object of the present invention is to provide a novel shift reactor for use with an underoxidized burner whose products include sulfur in the form of gaseous hydrogen sulfide, $H_2S$, and carbon in the form of $CO_2$, both of which spontaneously dissolve in the water which afford means for their removal.

A further object resides in placing a catalyzed shift reaction after the burner in such a manner that the shift can be repetitively reactivated without complex intervening hardware and valves.

Also, an object resides in inserting or placing a catalyst chamber after the burner and the water-cooling chamber utilizing simple flow controls and including simple means for recirculating.

Finally, an object is to enable the catalyst to be activated or reactivated in situ with the underoxidized burner and shift catalyst chamber attached in a unitary construction in a single overall container which simplifies the activation process.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with FIG. 1 which is a diagrammatic view of the inventive shift reactor used in connection with an underoxidized burner.

DESCRIPTION OF THE PREFERRED EMBODIMENT

Figure 1:
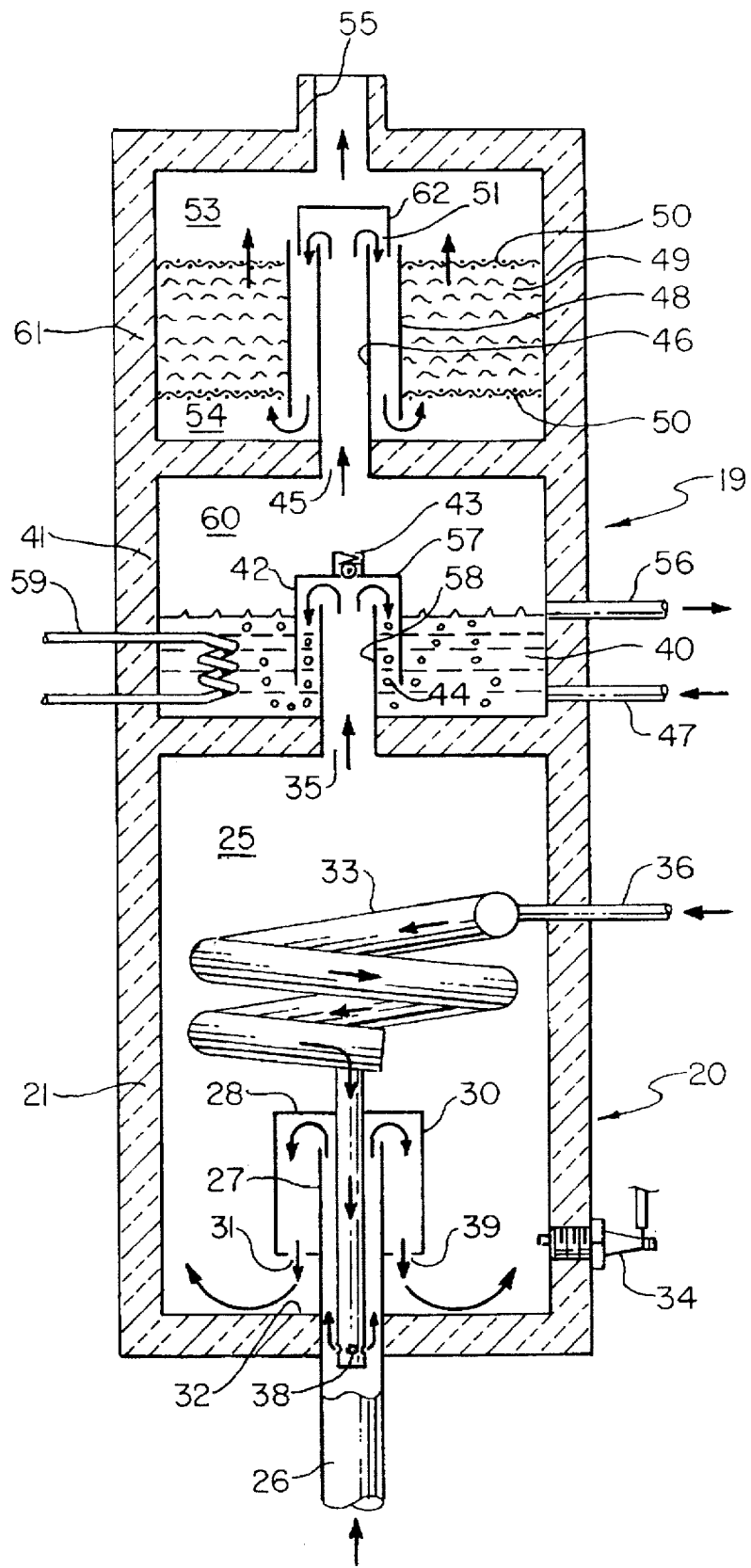

Referring to FIG. 1, an underoxidized burner is illustrated in the general direction of arrow 20 which has been previously disclosed in prior U.S. Pat. No. 5,207,185 and 5,299,536. Additionally, U.S. application Ser. No. 08/309,041 discloses improvements in injectors for such burners. The burner may be referred to as a hydrogen generator. In the present instance, its exhaust products are supplied to a special shift reactor, as indicated by numeral 19, which increases the hydrogen output and produces other advantages, and its major purpose is to supply hydrogen for various purposes, as for a fuel cell system.

Referring now in detail to FIG. 1, the hydrogen generator 20 is described with particular reference to U.S. Pat. No. 5,207,185 but applies to related patents and applications as above stated. It includes a housing 21 having an underoxidized combustion chamber 25 in which the hydrogen generating means are located. Fuel is introduced via a tube 36 leading to a heat exchanger 33 and subsequently to holes 38, in combination with air supplied via an inlet 26 so that the fuel/air is initially combined in a tube 27 within the combustion chamber 25. The fuel in heat exchanger 33 is preheated and liquid fuel vaporized by heat transfer with hot combustion gases in chamber 25. Tube 27 is open-ended so that the combined fuel/air is directed towards, and impinges on, a baffle 28 on the end of a cup 30. As indicated by the flow of arrows, the flow is reversed upon itself and exits through the open end of the cup 30, indicated by number 31. This process induces mixing of the air and fuel. The reversed flow exits the cup at the orifice or opening 31 and immediately impinges on the end of the burn wall, indicated by numeral 32, serving as a second baffle where the flow is again abruptly caused to move at successive right angles producing further mixing. The thoroughly mixed gas and air is now within the combustion chamber 25 wherein ignition of the mixed gases by gases already burning in the burner combustion chamber takes place. The initial ignition of the first entry of unignited gases occurs upon operation of a spark plug 34 having its electrodes within the combustion chamber 25. The flame continues through the burner and finally the exhaust or burner products exit at a discharge duct 35 from which they are introduced to the shift reactor assembly 19.

The underoxidized burner products include hydrogen ($H_2$) and carbon monoxide (CO). The concentration of hydrogen is substantially increased by effecting the shift reaction between carbon monoxide and water, $CO+H_2O=CO_2+H_2$. Conventionally, this reaction involves passage of water and carbon monoxide through a catalyst bed.

Calculations and preliminary tests have shown that the shift reaction plus various improvements can be attained by use of the combined inventive burner 20 and shift reactor 19 of FIG. 1.

A water bath section 41 of shift reactor 19 includes a plurality of diffuser apparatuses 57. In them, gaseous products from discharge duct 35 pass through a tube 58, are turned 180° on impinging onto the interior of a cup 42, and then enter cooler water bath 40 at opening 44. The gasses bubble through water 40, causing temperature and solution equilibration and dispersion of particulate matter, and then enter space 60 above the water from which they leave via opening 45 and pass into shift reactor section 61. One-way valve 43 on cup 42 closes when the pressure in cup 42 is greater than in space 60 and opens when the pressure in space 60 is lower than within cup 42, thus maintaining flow only in the desired direction. Inlet opening 47 is for introduction of water, which may derive from a downstream component, as a fuel cell effluent, and outlet opening 56 is for egress of excess water 40. Heat exchanger 59 may be used to heat water, which is then circulated elsewhere for heating purposes. It also may be connected to a downstream air-cooled exchanger for cooling water 40.

Gases leaving at opening 45 pass through a tube 46 and are directed downward on passing into cup 62. Tube 48 is of larger diameter than tube 46 and surrounds tube 46, and its upper end is higher than a catalyst bed 49, and its lower end is below catalyst bed 49. The top of tubes 46 and 48, cup 62 and annulus opening 51 constitute an eductor. Bed 49 is held in place by a pair of spaced apart screens 50 at top and bottom. The diameter of the cylindrical opening of cup 62 is greater than tube 46 and less than tube 48, and fits into the annulus between tubes 46 and 48, forming an opening 51. Cup 62 causes circulation at 51 to be turned down, and the relatively high velocity at opening 51 results in educting gases from a space 53 above the catalyst bed, which mix with the main gas stream to effect recirculation. The original and recirculated gases move to space 54 below catalyst bed 49. The mixture then passes upward through bed 49 and into space 53, eventually leaving at an outlet opening 55, and are then directed to the use site, such as a fuel cell.

In operation, gases from discharge duct 35 pass into water container 41. When the pressure at duct 35 is greater than that in space 60, one-way valve 43 prevents water from flowing into water bath section 41 and thence into duct 35, and vice versa. Other means of preventing reverse flow may be used without falling outside of the inventive concept. The gases passing orifice or opening 44 bubble through water 40.

One consequence of this process is temperature equilibration between gas and water, which depends on the original water temperature and flow rates both into space 60, via inlet 47, and out of space 60, via outlet 56, and the temperature and flow rate of the gases. The so-heated water is plumbed via outlet 56 to locations downstream of the system where heat is needed, such as space heating and the like. Or, water circulated through a heat exchanger 59 may be used for this purpose. These represent low cost and practical methods for collecting useful thermal energy normally provided by the burner via circulating heated water for external use in a water or space heater. Heat exchanger 59 coupled with an external air cooled heat exchanger may also be used for adjusting the water temperature.

The gases leaving space 60 at opening 45 spontaneously have become saturated with water vapor at the equilibrium temperature. Since this temperature is always lower than attained by the subsequent shift reactor (which develops heat), spontaneous condensation of water in the shift reactor, which may cause damage, is avoided. The water flow rate into space 60 via inlet 47 and out of outlet 56 are regulated to provide a temperature that produces the maximum acceptable water content for the shift. The process results in high hydrogen yield because the shift reaction is favored by the low temperature.

On passing through the water bath, gaseous $H_2S$, which is very soluble and is formed in the UOB when sulfur is present in the fuel, will dissolve in the water. This material is toxic and can poison the downstream shift reactor. It can be removed by directing the water to the sewer or passing the water through absorbents, such as calcium oxide or zinc oxide. The latter absorption process is more efficient from a water solution than from a gas mixture.

$CO_2$ formed by the UOB will also dissolve in the water and can be removed in a similar fashion.

While oxides of sulfur, as SO, $SO_2$ or $SO_3$, are not likely to be present in the effluent of an underoxidized burner, any which may form in non-optimized operation will also dissolve and can be removed in similar fashion.

Finally, particles of carbon which are produced by the UOB and can cause problems downstream of the system readily disburse in the water. They can then be removed by directing the water to a sewer or passage through a filter.

The cleansed and filtered gas from the water bath enters the shift chamber 61 via opening 45. The stream undergoes recirculation via eduction from space 53 at opening 51. The degree of recirculation via eduction is relatively mild: sufficient to aid heat transfer, which is critical to catalytic efficiency, but not enough to notably dilute concentrations, which would harm efficiency. One consequence of increased efficiency is need for a lesser amount of catalyst. Additionally, recirculation in the catalyst bed holds overall temperatures in bed 49 more nearly constant which permits optimized operation for the shift equilibrium.

The burner-shift and reactor design indicated in FIG. 1, locates the hydrogen producing process within a single overall container, which results in great overall simplifications. Yet, it remains highly versatile, as indicated, and leads to simple means to activate the catalyst, as next discussed.

So-called low temperature catalyst is normally supplied with its major operative component, copper, Cu, in the oxidized, ineffective CuO state. So-called high temperature catalyst, as C12 obtained from United Catalyst, Inc. consists of coprecipitated iron and chromium oxides. Activation involves reduction of the oxide, as CuO, to the metal, as Cu. It is normally accomplished by passing warmed, commercial hydrogen-containing gases through the catalyst bed (CuO+ $0.5H_2O$=Cu+$0.5H_2O$) with the bed removed from the system.

With the new design, however, this activation may, instead, be performed in situ by passing the output of the underoxidized burner, which contains considerable $H_2$, through the undisassembled system. In addition, underoxidized burner operations which can cause oxygen to pass through the catalyst, say during preheat with a burner with excess air, need not be avoided, and complex intervening hardware and valves to direct oxygen-containing gases around the catalyst chamber are not needed.

Thus, FIG. 1 does not include complex plumbing to bypass the catalyst chamber during preheat. This is not needed in the inventive process because the catalyst is rapidly reactivated during later passage of hydrogen-containing gases from the burner.

With catalyst, hydrogen yield is increased. However, similar results were obtained with porous rocks formed from cement, and comparable results are expected with pieces of copper. As a consequence, wherever this disclosure refers to catalysts, these may be replaced with materials with a large surface area.

While the combination of water bath section 41 and shift section 61 of shift reactor 19 have considerable advantages, it is notable that shift section 61 includes several novel features. Thus, for circumstances where water bath section 41 is not needed, section 41 may be eliminated and shift section 61 instead attached directly onto burner 20. In this case, water (or steam) required for the shift is introduced at known flow rates into opening 35 (or 45) where it is vaporized by the hot gases from the burner and the steam-gas mixture passed into tube 45 with the consequences as indicated previously.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

What is claimed is:

1. A combined underoxidized burner and shift reactor comprising:
   a housing having a discharge nozzle;
   an underoxidized burner disposed in said housing producing a gaseous exhaust;
   a first shift reactor disposed in said housing and in communication with said burner operable to receive said gaseous exhaust;
   a second shift reactor operable to receive gaseous exhaust from said first shift reactor and having an internal compartment partially occupied with a catalyst bed separating an upper and a lower collection chamber; and
   eductor means disposed in said second shift reactor for recirculating said gaseous exhaust between said upper and said lower collection chambers through said catalyst bed preparatory for exhausting through said discharge nozzle.

2. The invention as defined in claim 1 including:
   cleansing means carried on said housing in said first shift reactor between said burner and said second shift reactor for cleansing said gaseous exhaust and wherein said cleansing means includes a liquid bath with a gas diffuser for breaking down said gaseous exhaust preparatory for introduction to said eductor means; and
   said collection chamber receiving said gaseous exhaust in a cleansed and filtered condition from said cleansing means.

3. The invention as defined in claim 2 wherein:
   said eductor means in said upper collection chamber includes an open-ended tube connecting said upper and said lower collection chambers for conducting said gaseous exhaust therebetween;
   a cylinder surrounding said tube in spaced apart relationship and coaxial therewith; and
   a cup-like barrier covering one end of said tube to receive impingement of said gaseous exhaust so as to be redirected between said tube and said cylinder for passage between said upper and said lower collection chambers Via said catalyst bed.

4. The invention as defined in claim 3 including:
   cleansing means disposed in said first shift reactor including a liquid bath and a gas diffuser in close proximity to said liquid bath for redirecting said gaseous exhaust through said liquid bath.

5. The invention as defined in claim 4 wherein:
   said liquid bath is connected to a water supply from a fuel cell connected to said first shift reactor.

6. The invention as defined in claim 5 including:
   at least one check value disposed between said gas diffuser and said eductor means.

7. The invention as defined in claim 6 wherein:
   said catalyst bed includes a catalyst supported between a pair of screens separating said upper and said lower collection chambers.

8. The invention as defined in claim 7 wherein:
   said gas diffuser includes a tube conducting said gaseous exhaust from said burner through said liquid bath; and
   a closed end cylinder surrounding and coaxially disposed with respect to said gas diffuser tube in spaced relationship thereto for receiving and redirecting said gaseous exhaust about said tube and through said liquid bath.

9. The invention as defined in claim 8 wherein:
   said eductor employed for filtering said gaseous exhaust from said cleansing means.

10. A combined underoxidized burner and shift reactor comprising;
    a housing having a first chamber and a second chamber;
    inlet means operably disposed in said first chamber for receiving separate fuel and air inputs;
    a burner disposed in said first chamber and coupled to said separate fuel and air inputs for producing a gaseous exhaust;

said second chamber having a discharge nozzle communicating exteriorly of said second chamber;

means in said housing interconnecting said first chamber with said second chamber for receiving said gaseous exhaust;

a shift reactor disposed in said second chamber including a catalyst bed for receiving said gaseous exhaust via said interconnecting means;

said shift reactor further having an upper collection chamber within said second chamber above said catalyst bed and in communication with said discharge nozzle and a lower collection chamber separated from said upper collection chamber by said catalyst bed; and a recirculation eductor means interconnecting said upper and lower collection chambers for receiving said gaseous exhaust for recirculating said gaseous exhaust between said upper and lower collection chambers via said catalyst bed prior to discharge through said discharge nozzle.

11. A combined underoxidized burner and shift reactor comprising:

a housing having a first chamber, a second chamber and a third chamber, each chamber separated by a partition;

said second chamber in communication with said first chamber and said third chamber via a tube in each of said partitions respectively;

burner means disposed in said first chamber for producing a gaseous exhaust for introduction to said second chamber via said tube interconnecting said first chamber with said second chamber;

a cleansing bath in said second chamber having a gaseous diffuser means for receiving and redirecting said gaseous exhaust into said cleansing bath;

a shift reactor disposed in said third chamber including a catalyst bed; and said shift reactor and catalyst bed within said third chamber includes a recirculation eductor means for receiving said gaseous exhaust from said second chamber via said tube interconnecting said second chamber to said third chamber for introduction to said catalyst bed and subsequent exhaustion via a discharge nozzle.

12. The invention as defined in claim 11 wherein:

said recirculation eductor means produces an eductive change in said gaseous exhaust preparatory for exhaustion through said discharge nozzle.

13. The invention as defined in claim 12 including:

a heat exchanger disposed in said cleansing bath;

a fluid input leading into said cleansing bath; and a fluid output leading from said cleansing bath.

* * * * *